Dec. 26, 1967  J. F. EMERSON ET AL  3,359,627
METHOD OF BALANCING LEAKAGE REACTANCE IN RESOLVERS
Filed March 1, 1965
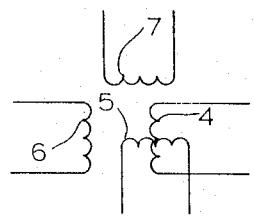
FIG. 1
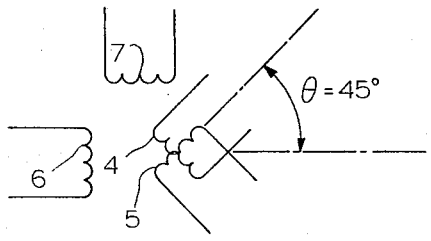
FIG. 2
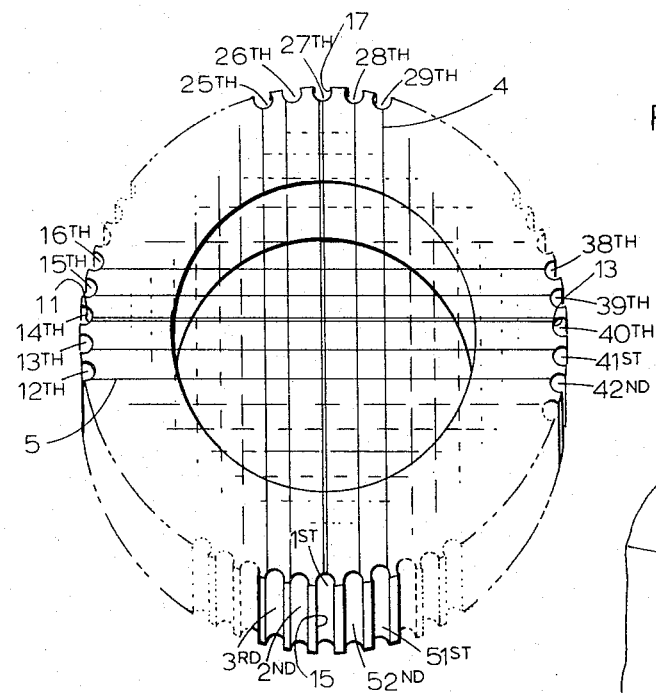
FIG. 3
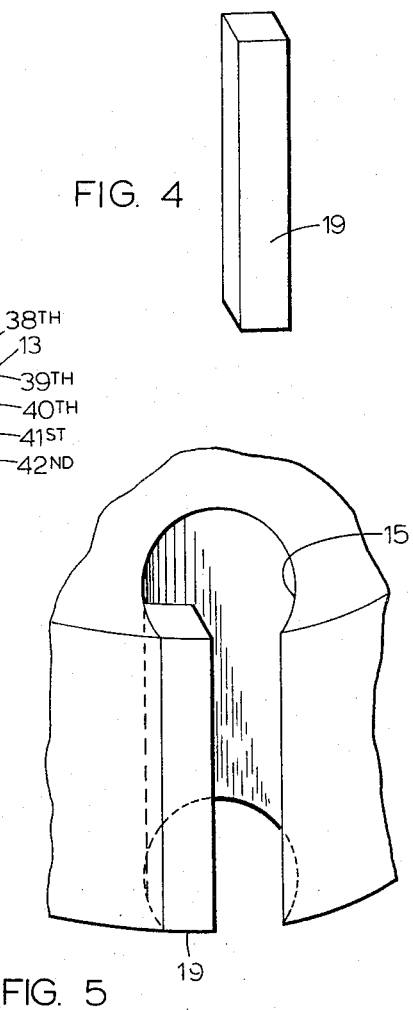
FIG. 4
FIG. 5
JOHN F. EMERSON
CHARLES W. LANG
INVENTORS
BY
*Francis H. Masselle*
ATTORNEY

United States Patent Office 3,359,627
Patented Dec. 26, 1967

3,359,627
METHOD OF BALANCING LEAKAGE REACTANCE IN RESOLVERS
John F. Emerson, Hackensack, and Charles W. Lang, Clifton, N.J., assignors to General Precision Inc., Little Falls, N.J., a corporation of Delaware
Filed Mar. 1, 1965, Ser. No. 435,888
1 Claim. (Cl. 29—593)

ABSTRACT OF THE DISCLOSURE

To balance leakage reactance in a resolver having windings displaced by 90°, the rotor is turned to the successive null points in the presence of excitation of one of the stator windings. Slots are selected in the vicinity of the winding producing the smaller output and magnetically permeable pins are fixed in place in these slots.

---

This invention relates to methods for improving the accuracy of AC resolvers, synchros and the like and more particularly to a method for reducing the increased errors which appear in the output of a resolver only when the resolver is subjected to an electrical load.

A resolver is an instrument for producing output signals representing trigonomeric functions of an input angle. The AC type of resolver usually comprises a pair of wound components, a rotor having two windings wound thereon and a stator also having two windings wound thereon. The output voltages are the output signals representing trigonometric functions of the angular position of the rotor. In practice, the resolver output does not correspond exactly with the trigonometric function which it represents due to some error factors. Also, the accuracy of a resolver changes when the resolver is subjected to an electrical load. This change in accuracy occurs because different characteristics affect the accuracy when the resolver is eletrically loaded than when it is not. A large part of the change in accuracy is due to unbalance in leakage reactance, which has little effect when the resolver is not subjected to an electrical load. In accordance with the present invention, the leakage reactances are balanced so as to reduce the change in error which is due to unbalanced leakage reactances.

In the preferred embodiment, the balancing of the leakage reactance is accomplished by adding magnetically permeable pins to selected slots in one and/or both wound components, i.e., the rotor and/or the stator of the resolver. The slots are selected in accordance with the change in error, which occurs when the resolver is subjected to an electrical load, so as to balance the leakage reactances. Alternatively, magnetically permeable material could be removed from selected slots so as to balance the leakage reactances. The invention is not limited to resolvers and can be applied to other similar instruments of the type having a rotor and a stator with two or more angularly displaced windings wound in slots on the rotor and/or stator, such as synchros.

Accordingly, an object of the present invention is to improve the accuracy of resolvers and other similar instruments.

A further object of the present invention is to provide a method of reducing the change in error in the output signals from resolvers and other similar instruments when the instruments are subjected to electrical load.

A further object of the present invention is to balance the leakage reactances in resolvers and other similar instruments so as to reduce the errors which occur as a result of unbalanced leakage reactance.

Further objects and advantages of the present invention will become readily apparent as the following detailed description of the invention unfolds and when taken in conjunction with the accompanying drawings. The details are based on the use of a resolver in which the stator contains the primary or energized windings. The application of the invention to rotor primary resolvers and other similar instruments is apparent to those skilled in the art.

FIG. 1 schematically illustrates a resolver of the type to which the present invention applies;

FIG. 2 schematically illustrates the resolver of FIG. 1 with the rotor turned through 45°;

FIG. 3 illustrates the rotor of the resolver;

FIG. 4 illustrates one of the pins which are placed in selected slots of the rotor of the resolver in accordance with the present invention; and FIG. 5 shows how a magnetically permeable pin is positioned in a slot in the rotor in accordance with the present invention.

The resolver schematically illustrated in FIG. 1 comprises two rotor windings 4 and 5 angularly displaced from each other by 90° and two stator windings 6 and 7 also angularly displaced from each other by 90°. If a constant AC voltage is applied across one of the stator windings 6 and 7, the rotor windings 4 and 5 will produce output signals proportional to the sine and cosine of the angular position of the rotor. For example, if a constant AC voltage is applied across the winding 6, then the winding 4 will produce an output signal proportional to the cosine $\theta$, in which $\theta$ as shown in FIG. 2 is the angular displacement of the rotor from its position shown in FIG. 1 in a counterclockwise direction. The angle $\theta$, which in FIG. 2 is 45°, thus is the angular position of the rotor. If a constant AC voltage is applied across the stator winding 7, the winding 4 will produce an output signal proportional to sine $\theta$ and the winding 5 will produce an output signal proportional to cosine $\theta$. The resolver, therefore, is actually a variable transformer, the output voltages of which vary as the sine and cosine of the angular position of its rotor. If AC signal voltages $E_1$ and $E_2$ are applied simultaneously to the stator windings 6 and 7, then the winding 4 will produce a theoretical output signal voltage $E_3$ in accordance with the following equation (where the signs shown in the equation may differ from those shown dependent upon the definition of electrical zero and the sense of the terminal connections employed):

$$E_3 = KE_1 \cos \theta - KE_2 \sin \theta$$

and the winding 5 will produce a theoretical output signal $E_4$ in accordance with the following equation (where the signs may likewise differ):

$$E_4 = KE_2 \cos \theta + KE_1 \sin \theta$$

in which K is a constant. However, the actual output may not correspond to the foregoing theoretical outputs because of certain error factors.

When the rotor windings are electrically loaded, the output signal voltages from the two windings will be reduced. If the output signal from both windings is reduced by the same factor, then the electrical loading of the winding merely causes a known change in the value of K and, therefore, does not result in a change in error. However, because the leakage reactance associated with one winding may be greater than the other, the output voltage from one winding may be reduced by a greater factor than the other, thus resulting in comparative errors between the output voltages from the two windings. The present invention serves to reduce these comparative errors.

As shown in FIG. 3, the rotor of a resolver is generally of a drum or cylindrical configuration comprising magnetically permeable laminations. The particular resolver rotor shown has 52 slots defined in its cylindrical surface evenly distributed about the axis of the rotor and extending parallel to the axis of the rotor. The rotor windings 4 and 5 are wound on the rotor in the rotor slots displaced from each other by 90°.

Each of the windings 4 and 5 has a winding axis and the winding axis of the winding 4 is displaced 90° from the winding axis of winding 5. For the present purpose the winding axis of a rotor winding coincides with the effective axis of the flux that would be produced by said winding if said winding were energized (which it is not, since for the present example the rotor is the secondary). For the present purpose we are not concerned with the winding axis in its entirety, but rather with the points at which the winding axis intersects the outer portion of the rotor. Along the circumference of the rotor, there are points at which the magnetic potential gradient is zero. For a given winding there are two such points, hereafter called null points, 180° apart; and the null points of the winding 4 are displaced by 90° from the null points of winding 5. In the rotor shown in FIG. 3, the slots designated by the reference numbers 11 and 13 are at the null points of the winding 4 and the slots designated by the reference numbers 15 and 17 are at the null points of the winding 5.

In the 52 slot arrangement shown in FIG. 3, winding 4 is inserted so that its axis (i.e., flux or winding axis) passes through slot 14 (reference No. 11) and slot 40 (reference No. 13), therefore its null points are the 14th and 40th slots. Winding 5 is inserted so that its axis passes through slot 1 (reference No. 15) and slot 27 (reference No. 17), therefore its null points are the 1st and 27th slots. For those cases where the winding configuration is such that the null points do not coincide with a slot, it is the slots immediately adjacent to the null points that will be considered the null points.

In accordance with the invention, the rotor of the resolver is turned to an input angle of 45° as shown in FIG. 2 and an AC voltage is applied across just one of the stator windings 6 and 7. The resulting output signal voltage from the windings 4 and 5 should be equal. If they are not equal, the magnitude of the error is normally determined by turning the rotor until the two output signal voltages are equal and noting the difference between the actual angular position of the rotor and 45°. While the error, if the resolver is properly made, will be small when the rotor windings are not electrically loaded, there is a good chance that when the windings are electrically loaded the output signals will not remain precisely in the same ratio due to unbalanced leakage reactance in the rotor. In accordance with the invention, the windings 4 and 5 are subjected to equal electrical loads while the rotor is positioned at the angle near 45° which gives equal voltages without electrical load, and the output signal voltages from the two windings are compared. If the signal voltages are not equal, one or more magnetically permeable pins are cemented in the slots preferably at the null points of the winding which is producing the smaller of the two output signal voltages. The cementing of the pins in these slots will increase the leakage reactance of the winding which is producing the larger of the two output signal voltages and thus decrease the output signal from this output winding without affecting the output signal voltage from the winding which produces the smaller of the two output signal voltages since the pins are at the null points of this winding. In this manner, the output signal voltages from the two windings can be made to more nearly remain in the same ratio when the electrical load is removed and the comparative error at 45°, which appears when the windings are electrically loaded, is reduced. The pins need not be placed in the null point slots, but this then reduces the effect on the winding in question and will cause an additional effect on the other output winding.

For example, if the output from the winding 4, which has its null points at slots designated by reference numbers 11 and 13 (i.e., the 14th and 40th slot), is greater than the output from the winding 5, which has its null points at slots designated by reference numbers 15 and 17 (i.e., the 1st and 27th slot), when the windings are subjected to an electrical load, then the magnetically permeable pins will be cemented into the slots 15 and 17, i.e., the 1st and 27th slots to thus increase the leakage reactance in the winding 4 without substantially affecting the leakage reactance of the winding 5. In this manner, the output signal voltage of the winding 4 will be reduced to more nearly equal that of the winding 5 when the windings are subjected to an electrical load at 45°. Similarly, if the output signal from the winding 5 is greater than the output signal from the winding 4 when the rotor is placed at 45° and subjected to an electrical load, then the pins should be placed in the slots with reference numbers 11 and 13 which will increase the leakage reactance of the winding 5 but will not significantly affect the leakage reactant of the winding 4 since these slots are at the null points of the winding 4. In this manner, the output signal voltage from the winding 5 will be reduced to more nearly equal that of the winding 4 when the windings are subjected to an electrical load at 45°.

Normally it would be expected that if the output signal voltage from one of the rotor windings is greater at plus 45°, then the output from this same winding should also be greater at minus 45°. Accordingly, the placing of the pins in the slots which are at the null points of the winding which produces the smaller output voltage should correct the errors at both plus 45° and minus 45°. In those instances when the output signal voltage from the same winding is not greater or not greater to the same degree at both plus 45° and at minus 45° when the windings are subjected to an electrical load, and one of the errors is outside tolerance limits while the other is within tolerance limits, the error may still be brought within tolerance by placing pins in the poroper slots. For example, if the tolerance is 20 arc-seconds and the output signal from the winding 4 is greater at plus 45° while at minus 45° the output signal from the winding 5 is greater with the magnitude of the error at plus 45° equal to 25 arc-seconds and the magnitude of the error at minus 45° equal to 5 arc-seconds, then the system can be brought within tolerance limits by placing the pins in the slots designated by reference numbers 15 and 17.

In short, when the errors are different at plus 45° as compared to minus 45°, the solution is to split the difference. Pins are added to reduce the higher of the two outputs within the requirements of the system, but not sufficient to reduce the higher error to zero; since, if this were done, the lower of the two errors might increase to a value higher than the limit set by the system. If the errors at plus 45° and minus 45° are not equal in magnitude and also opposite in sign, the best that can be done is to use pins so that the errors at plus 45° and minus 45° have the same magnitude and sign. This residual or bias error can then be eliminated through the use of pins in the stator slots.

The preferred position of the stator pins, when the windings are subjected to an electrical load, to remove this bias error is determined as follows. The rotor is positioned to either plus or minus 45° and pins are added to those two stator slots that coincide with the two null points of the rotor winding having the smaller output voltage. The bias error is such that if one rotor winding has the smaller output voltage at plus 45°, it is the other rotor winding that has the smaller output voltage at minus 45°. Hence, it makes no difference at which of these two angles the correction is made. It should be noted that if the compensation afforded by the pins in the two stator slots so selected is insufficient, additional pins may be added in adjacent slots. It should be further noted that if the points in the stator that coincide with the rotor null points are not located at a stator slot, the pins should be placed in the slots adjacent to said point, preferably in a symmetrical manner.

The actual operation in the preferred embodiment is carried out by a trial-and-error method by first temporarily cementing the pins in the slot and then testing to see if additional corrections are needed. If additional pins are needed, they are cemented in the slots adjacent to the slots at the null points while maintaining symmetry about the null points. When the errors are brought within tolerance limits, the pins are permanently cemented in.

As shown in FIG. 4, the magnetically permeable pins are oblong in shape; although this shape is preferred, it is not necessary for the proper functioning of the invention. The pins are also substantially smaller than the slots of the rotor so they can be cemented lying flat against one side of the slot as shown in FIG. 5 without bridging across the slot. In FIG. 5 the pin is designated by the reference number 19. Preferably, the pin should not bridge the slot, because if the pin should bridge the slot small changes in the position of the pin would have large effects on the compensation.

The above invention has been described as being applied to a resolver in which the stator has the primary or energized winding(s); but it should be understood that the invention is equally applicable to resolvers in which the rotor has the primary or energized winding(s) and to other similar instruments making use of a wound slotted rotor and/or stator having two or more windings angularly displaced from each other. Moreover, the errors, instead of being corrected by adding pins to the slots, could be corrected by removing magnetically permeable material from the slots spaced 90° from the slots to which the pins would be added. Correction of the error in this manner comes within the broad concept of the invention, although the adding of pins is clearly the preferred method since it is significantly easier and also the pins can be tried and removed in the trial-and-error method. Likewise, the pins need not be inserted in the null slots 180° apart, although this is preferred.

The above invention has been described as reducing the change in error when going from a no load condition to one in which the secondary windings are subjected to an electrical load; but it should be understood that this invention can be utilized to improve (i.e., reduce) the error obtained when the secondary windings are subjected to fixed electrical load, without regard (references to) the no load error.

These and many other modifications can be made without departing from the spirit and scope of the invention, which is defined in the appended claim.

What is claimed is:

A method of balancing leakage reactance in an instrument having magnetically permeable stator and rotor wound components with slots angularly spaced about the axes of said wound components and each having at least two windings disposed in the slots of said rotor and stator angularly displaced from each other by ninety degrees, comprising the steps of applying an AC voltage across one of the stator windings, rotating the rotor until the output from each of the rotor windings approaches a null point, selecting slots in said wound components in the vicinity of the null points of the one winding producing the smaller output voltage so that the addition of magnetically permeable material will increase the leakage reactance of one of the rotor windings which has less leakage reactance than the other of said rotor windings, and mounting magnetically permeable pins in the selected slots by fixing the pins to the sides of the selected slots without bridging across said slots.

References Cited
UNITED STATES PATENTS

| | | | |
|---|---|---|---|
| 659,716 | 10/1900 | Thomson | 336—135 X |
| 2,432,003 | 12/1947 | Giannini | 310—191 X |
| 2,882,483 | 4/1959 | Stephenson | 310—111 X |
| 3,166,686 | 1/1965 | Mea | 310—111 X |

LARAMIE E. ASKIN, *Primary Examiner.*

T. J. KOZMA, *Assistant Examiner.*